United States Patent
Kosaka et al.

(10) Patent No.: US 11,060,465 B2
(45) Date of Patent: Jul. 13, 2021

(54) FUEL SUPPLY SYSTEM

(71) Applicant: HONDA MOTOR CO., LTD., Tokyo (JP)

(72) Inventors: Yosuke Kosaka, Wako (JP); Katsuji Wada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 16/445,756

(22) Filed: Jun. 19, 2019

(65) Prior Publication Data

US 2019/0390614 A1  Dec. 26, 2019

(30) Foreign Application Priority Data

Jun. 20, 2018  (JP) .............................. JP2018-117344

(51) Int. Cl.
| | |
|---|---|
| *F02D 19/02* | (2006.01) |
| *F02M 65/00* | (2006.01) |
| *F02D 41/22* | (2006.01) |
| *F02D 41/38* | (2006.01) |

(52) U.S. Cl.
CPC ......... *F02D 19/025* (2013.01); *F02D 41/222* (2013.01); *F02M 65/00* (2013.01); *F02D 2041/223* (2013.01); *F02M 2200/247* (2013.01)

(58) Field of Classification Search
CPC ................ F02D 19/025; F02D 41/222; F02D 2041/223; F02D 41/3845; F02D 2200/0602; F02M 65/00; F02M 2200/247; Y02T 10/40
See application file for complete search history.

(56) References Cited

U.S. PATENT DOCUMENTS

2015/0322902 A1\* 11/2015 Akita ................. F02M 25/0809
                                                                  123/519

FOREIGN PATENT DOCUMENTS

JP        2001-336460 A    12/2001

\* cited by examiner

*Primary Examiner* — Peter J Macchiarolo
*Assistant Examiner* — Anthony W Megna Fuentes
(74) *Attorney, Agent, or Firm* — Westerman, Hattori, Daniels & Adrian, LLP

(57) ABSTRACT

A fuel supply system with a fuel pressure sensor includes a failure detection part which sets a first threshold value and a second threshold value which are deviated by first (smaller) and second (larger) predetermined values with respect to a target fuel pressure respectively; immediately detects a possibility of failure in the case where an absolute value of a difference between an output value of the fuel pressure sensor and the target fuel pressure exceeds an absolute value of a difference between the second threshold value and the target fuel pressure; and determines a failure of the fuel pressure sensor in the case where the absolute value of the difference between the output value of the fuel pressure sensor and the target fuel pressure has been exceeding an absolute value of a difference between the first threshold value and the target fuel pressure for a specified time or longer.

4 Claims, 3 Drawing Sheets

FUEL SUPPLY SYSTEM

CROSS REFERENCES TO RELATED APPLICATIONS

The present application claims priority under 35 U.S.C. § 119 to Japanese Patent Application No. 2018-117344, filed Jun. 20, 2018, entitled "FUEL SUPPLY SYSTEM." The contents of this application are incorporated herein by reference in their entirety.

TECHNICAL FIELD

The present disclosure relates to a fuel supply system and, and more particularly, to a fuel supply system for detecting a possibility of failure of or for determining the failure of a fuel pressure sensor used in the fuel supply system.

BACKGROUND

In a conventional internal combustion engine, there is a case of feedback-controlling a fuel pump according to a measured value of fuel pressure detected by a fuel pressure sensor. In such a feedback control, in the case where an output value of the fuel pressure sensor is lower than an actual fuel pressure due to a failure of the fuel pressure sensor, the actual fuel pressure is controlled to be higher than a target fuel pressure, while in the case where the output value of the fuel pressure sensor is higher than the actual fuel pressure, the actual fuel pressure is controlled to be lower than the target fuel pressure.

Thus, as a technique for detecting a failure of a fuel pressure sensor, Japanese Patent Application Publication No. 2001-336460 discloses a technique in which the failure determination timing of the fuel pressure sensor is set based on a fuel pressure feedback correction control amount and when a deviation between an output value of the fuel pressure sensor and an actual fuel pressure value in this failure determination timing is a predetermined value or higher, the abnormality of the fuel pressure sensor is determined.

SUMMARY

However, in the case where a fuel pressure sensor is used in a fuel supply system adapted to supply fuel under high pressure, since a setting range of the fuel pressure sensor is set wider than a conventional system, in the case where the fuel pressure sensor is disconnected or a short circuit is caused, a correction value used for calculation of a fuel injection amount becomes too large or too small and there is a risk that an engine stall or a misfire may occur before a failure is determined, thereby giving a damage to a catalyst used in the fuel supply system.

Accordingly, it is preferable to provide a fuel supply system capable of preventing the occurrence of engine stall or misfire by detecting a possibility of failure before the failure of a fuel pressure sensor is determined.

(1) In one aspect, a fuel supply system (e.g., "a fuel supply system 1" described later) with a fuel pressure sensor (e.g., "a fuel pressure sensor 53" described later) according to the present disclosure comprises a failure detection part (e.g., "a failure detection part 101" described later) for detecting a failure of the fuel pressure sensor, wherein the failure detection part comprises: a threshold setting part (e.g., "a threshold setting part 102" described later) for setting a first threshold value which is deviated by only a first predetermined value with respect to a target fuel pressure and a second threshold value which is deviated by only a second predetermined value which is larger than the first predetermined value with respect to the target fuel pressure; a failure possibility detection part (e.g., "a failure possibility detection part 103" described later) adapted to immediately detect a possibility of failure in the case where an absolute value of a difference between an output value of the fuel pressure sensor and the target fuel pressure exceeds an absolute value of a difference between the second threshold value and the target fuel pressure; and a failure determination part (e.g., "a failure determination part 104" described later) adapted to determine a failure of the fuel pressure sensor in the case where an absolute value of the difference between an output value of the fuel pressure sensor and the target fuel pressure exceeds an absolute value of the difference between the first threshold value and the target fuel pressure for a specified time or longer.

According to the above item (1), in the fuel supply system in which a setting range of the fuel pressure sensor is set wider than hitherto, in the case where the fuel pressure sensor is disconnected or a short circuit is caused, it is possible to detect a possibility of failure of the fuel pressure sensor before the failure of the fuel pressure sensor is determined, thereby capable of preventing the occurrence of engine stall or misfire. Also, in the case where failure possibility of the fuel pressure sensor is detected, excessive correction can be suppressed by setting the second threshold value with respect to the target fuel pressure.

(2) The fuel supply system according to the item (1), in the case where the failure possibility detection part detects a possibility of failure, may further comprise a fuel pressure value changing part (e.g., "a fuel pressure value changing part 105" described later) adapted to change a fuel pressure value for fuel calculation to the second threshold value.

According to the item (2), even though the absolute value of the difference between an output value of a fuel pressure sensor and a target fuel pressure exceeds a difference of the absolute value of the difference between the second threshold value and the target fuel pressure, in the case where it does not exceed the absolute value of a difference between the first threshold value and the target fuel pressure for a specified time or longer, since a failure of a fuel pressure sensor is not determined and feedback control is continued, it is possible to more properly perform the feedback control of a high-pressure fuel pump while preventing the occurrence of engine stall or misfire.

According to one embodiment of the present disclosure, by detecting a possibility of failure before a failure of a fuel pressure sensor is determined, it is possible to provide a fuel supply system capable of preventing the occurrence of engine stall or misfire.

DETAILED DESCRIPTION

Figure 1:
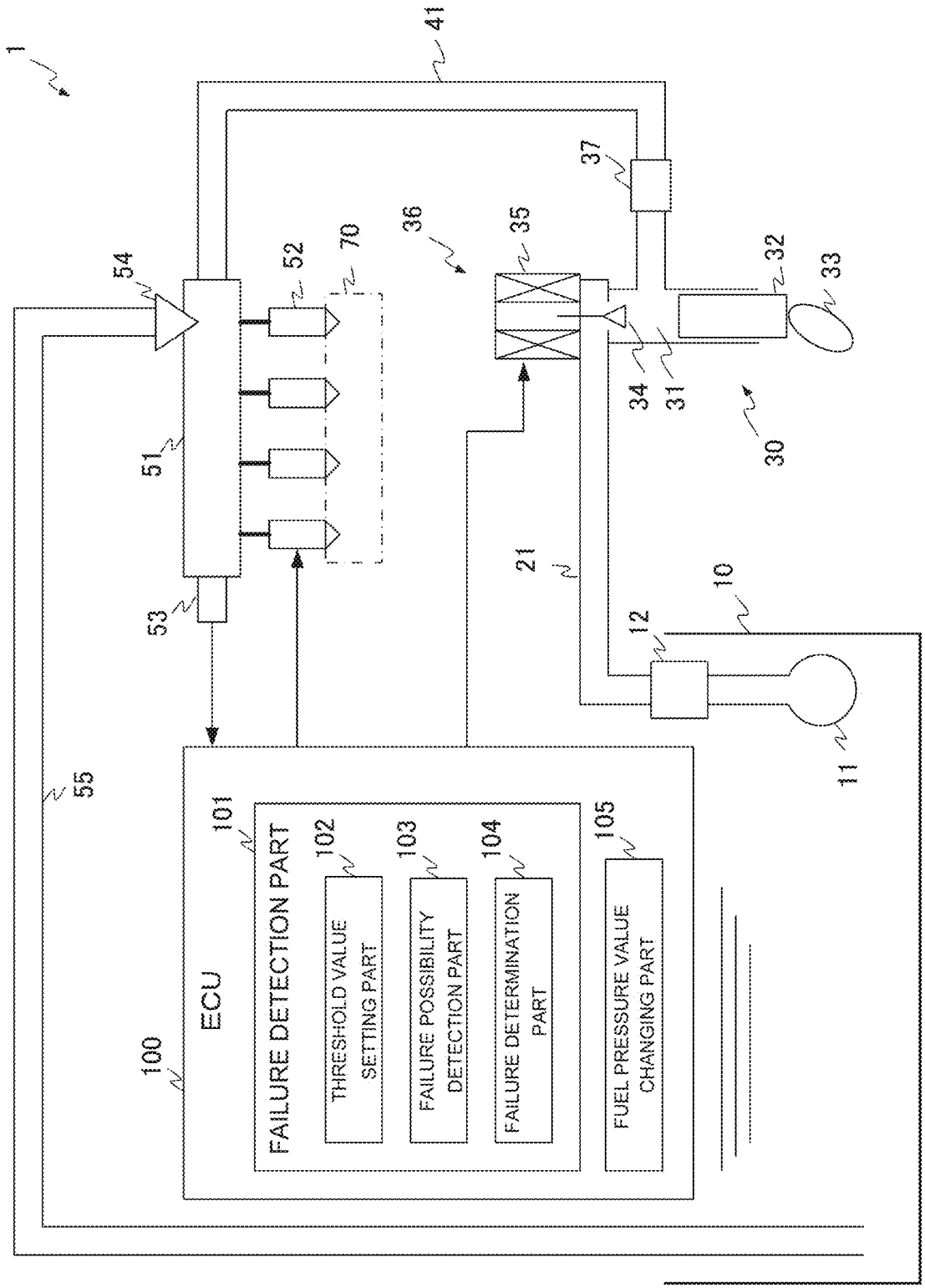
FIG. 1 is a view showing an overall structure of a fuel supply system according to a preferred embodiment of the present disclosure.
Figure 2:
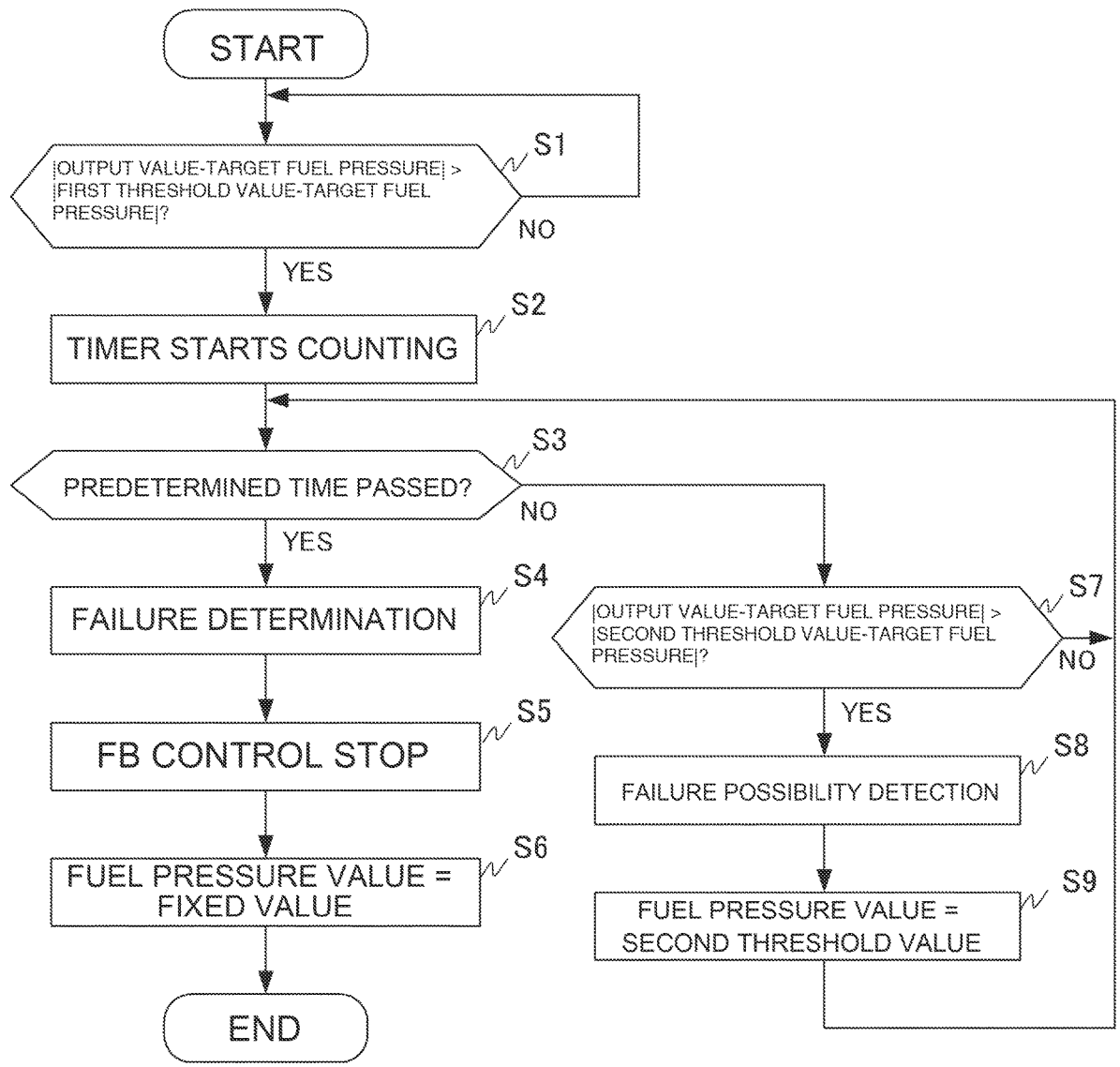
FIG. 2 is a flow chart showing the operation of the fuel supply system according to the embodiment of the present disclosure.
Figure 3:
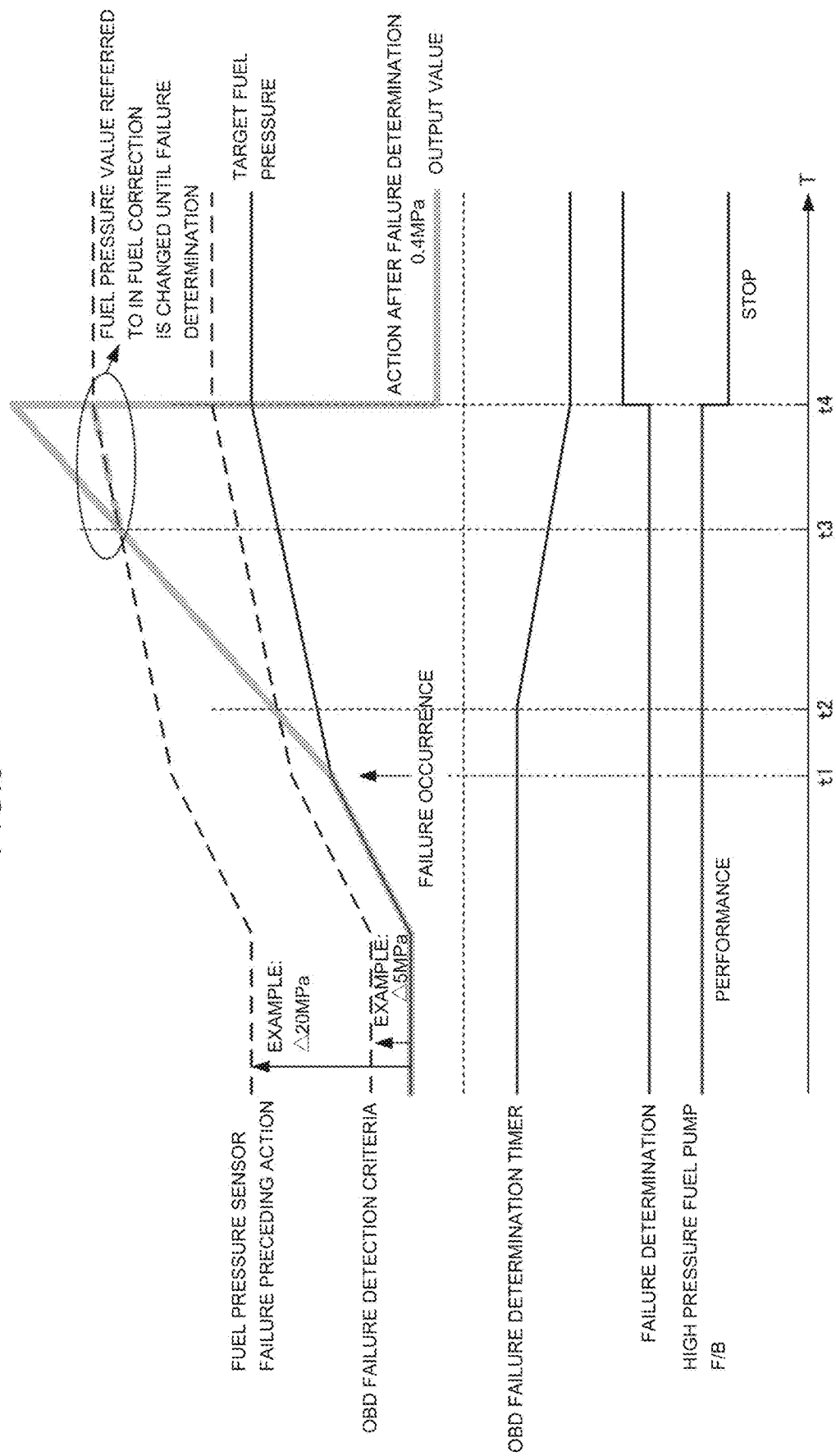
FIG. 3 is a time chart showing an operation example of the fuel supply system according to the embodiment of the present disclosure.

The structure and operation of a fuel supply system according to the present embodiment will now be described with reference to FIGS. 1 to 3. FIG. 1 is an overall structure view of a fuel supply system according to the present embodiment. FIG. 2 is a flow chart showing the operation of the fuel supply system according to the present embodiment. FIG. 3 is a time chart showing an operation example of the fuel supply system according to the present embodiment.

1 Structure of the Embodiment

For example, assuming that, in a conventional 20 MPa system, a fuel pressure sensor with a sensor full scale of 0-24 MPa is used, while in a 35 MPa system that is a fuel supply system adapted to supply fuel under high pressure, a sensor range is altered due to high fuel pressurization of a relief pressure that is a criterion for a relief valve to relieve internal pressure and a fuel pressure sensor with a sensor full scale of 0-60 MPa is used. In this case, in the conventional system, an output value of the fuel pressure sensor in a normal state is 4 MPa, but there is a possibility that the output value of the fuel pressure sensor becomes 24 MPa in the case where the fuel pressure sensor fails due to disconnection and a fuel correction factor is only 0.4 times even in the case where the deviation is the largest as compared to the normal state and therefore, engine stall is not generated. On the other hand, in the fuel supply system, the output value of the fuel pressure sensor in the normal state is likewise 4 MPa, but there is a possibility that the output value of the fuel pressure sensor in the case of failure becomes 60 MPa and since the fuel correction factor becomes 0.25 times in the case where the deviation is the largest as compared to the normal state, a case where a fuel value is not enough, thereby leading to the engine stall.

In other words, in the fuel supply system adapted to supply fuel under high pressure, since the fuel pressure sensor whose sensor full scale is wider when compared to a conventional system, is used, a case where the fuel correction factor may become too large or too small, thereby engine stall may occur.

Now, as shown in FIG. 1, a fuel supply system 1 according to the present embodiment mainly comprises a fuel tank 10, a feed pump 11, a high pressure fuel pump 30, a delivery pipe 51, a fuel pressure sensor 53, ECU (an electronic control unit) 100, wherein the ECU 100 comprises a failure detection part 101. The structure of the fuel supply system 1 will be described hereinafter basically according to a flow of fuel which is stored in the fuel tank 10.

The feed pump 11 is a pump for sending out the fuel stored in the fuel tank 10 to the high pressure fuel pump 30. The fuel led out from the fuel tank 10 by the feed pump 11 is sent out to the high pressure fuel pump 30 through a pressure regulator 12 and a low pressure fuel passage 21. Now, the pressure regulator 12 is a device for keeping fuel pressure of the fuel passing through the low pressure fuel passage 21 at a constant level.

The high pressure fuel pump 30 is provided with a compression chamber 31, a plunger 32, a cam 33, a spill valve 34, a solenoid 35 and a solenoid valve 36. By reciprocating the plunger 32 within the compression chamber 31 by the rotation of the cam 33, a capacity of the compression chamber 31 increases or decreases. By moving the plunger 32 in such a direction as to decrease the capacity of the compression chamber 31, the fuel within the compression chamber 31 is pressurized to a high pressure.

Also, the solenoid valve 36 opens and closes the spill valve 34 by an applied voltage to the solenoid 35 which is disposed between the low pressure fuel passage 21 and the compression chamber 31. When moving the plunger 32 in such a direction as to increase the capacity of the compression chamber 31, the spill valve 34 is opened by stopping the application of the voltage to the solenoid 35, thereby allowing the low pressure fuel passage 21 to communicate with the compression chamber 31. On the other hand, when moving the plunger 32 in such a direction as to decrease the capacity of the compression chamber 31, the spill valve 34 is closed by applying the voltage to the solenoid 35 to block the communication between the low pressure fuel passage 21 and the compression chamber 31.

In other words, by application of or stopping the application of the voltage to the solenoid 35, the spill valve 34 is opened and closed to be able to control the pressure of the fuel within the compression chamber 31.

The fuel highly pressurized by the high pressure fuel pump 30 is sent out to the delivery pipe 51 through a pressure regulator 37 and a high pressure fuel passage 41. Now, the pressure regulator 37 is a device for keeping fuel pressure of the fuel passing through the high pressure fuel passage 41 at a constant level.

The delivery pipe 51 is mainly provided with a fuel injection device 52, a fuel pressure sensor 53 and a relief valve 54. The fuel injection device 52 is a device for injecting high pressure fuel into an engine 70. The fuel pressure sensor 53 is a sensor for detecting the fuel pressure within the delivery pipe 51 and an output value of the fuel pressure sensor 53 is output to ECU 100. The relief valve 54 is a valve which is opened when the pressure within the delivery pipe 51 exceeds a predetermined value to lower the pressure within the delivery pipe 51. The relief valve 54 is opened and the fuel discharged into a fuel passage 55 decreases its pressure as it passes through the fuel passage 55 and is returned to the fuel tank 10.

ECU 100 is a computer consisting of an I/O interface for A/D converting a detection signal of a sensor such as a fuel pressure sensor 53 and the like, RAM or ROM for storing various control programs, data and the like and CPU and the like for performing various arithmetic processing according to the above programs. As a control module realized by such a hardware configuration as stated above, ECU 100 is composed of a threshold value setting part 102, a failure possibility detection part 103 and a failure determination part 104 that are included in the failure detection part 101, and a fuel pressure value changing part 105.

The failure detection part 101 is a part for detecting a failure of the fuel pressure sensor 53 and includes the threshold value setting part 102, the failure possibility detection part 103 and the failure determination part 104.

The threshold value setting part 102 sets a threshold value which becomes the criteria for judgment in the case where the failure possibility detection part 103 stated later detects a possibility of failure and the failure determination part 104 determines the failure. More specifically, the threshold value setting part 102 sets a first threshold value which is deviated by only a first predetermined value with respect to a target fuel pressure and a second threshold value which is deviated by only a second predetermined value which is larger than the first predetermined value with respect to the target fuel pressure.

It is to be noted that the first threshold value may be a value adding the first predetermined value to the target fuel pressure or a value subtracting the first predetermined value from the target fuel pressure. Likewise, the second threshold value may be a value adding the second predetermined value to the target fuel pressure or a value subtracting the second predetermined value from the target fuel pressure.

The failure possibility detection part 103 immediately detects a failure possibility in the case where an absolute value of a difference between an output value of the fuel pressure sensor 53 and a target fuel pressure exceeds an absolute value of a difference between the second threshold value and the target fuel pressure. More specifically, in the case where the second threshold value is a value higher than the target fuel pressure, the failure possibility detection part 103 immediately detects a failure possibility of the fuel pressure sensor 53 when an output value of the fuel pressure sensor 53 exceeds the second threshold value. On the other hand, in the case where the second threshold value is a value lower than the target fuel pressure, the failure possibility detection part 103 immediately detects a failure possibility of the fuel pressure sensor 53 when the output value of the fuel pressure sensor 53 is lower than the second threshold value.

The failure determination part 104 determines a failure of the fuel pressure sensor 53 in the case where an absolute value of the difference between the output value of the fuel pressure sensor 53 and the target fuel pressure exceeds an absolute value of the difference between the first threshold value and the target fuel pressure for a specified time or longer. More specifically, in the case where the first threshold value is a value higher than the target fuel pressure, the failure determination part 104 determines a failure of the fuel pressure sensor 53 when a state in which the output value of the fuel pressure sensor 53 exceeds the first threshold value continues for a specified time or longer. On the other hand, in the case where the first threshold value is a value lower than the target fuel pressure, the failure determination part 104 determines the failure of the fuel pressure sensor 53 when a state in which the output value of the fuel pressure sensor 53 is lower than the first threshold value continues for a specified time or longer.

The fuel pressure value changing part 105 changes a fuel pressure value for fuel calculation to a second threshold value in the case where a failure possibility of the fuel pressure sensor 53 is detected by the failure possibility detection part 103. With this, it is possible to prevent a correction value for fuel calculation from being too large or too small. Also, the fuel pressure value changing part 105 changes the fuel pressure value for fuel calculation to a fixed value in the case where the failure of the fuel pressure sensor 53 is determined by the failure determination part 104.

The fuel supply system 1 is provided with the above structure and can detect the failure possibility of the fuel pressure sensor 53 before the failure of the fuel pressure sensor 53 is determined and prevent the occurrence of engine stall or misfire. Further, the fuel supply system 1, in the case where the failure possibility of the fuel pressure sensor 53 is detected, can suppress the excessive correction by setting the second threshold value with respect to the target fuel pressure.

2 Operation of the Fuel Supply System

FIG. 2 is a flow chart showing the operation of a fuel supply system 1 according to the present embodiment. The operation of the fuel supply system 1 will be described hereunder with reference to FIG. 2.

In step S1, in the case where an absolute value of a difference between the output value and the target fuel pressure is higher than the absolute value of the difference between the first threshold value and the target fuel pressure (S1: YES), processing proceeds to step S2. On the other hand, in the case where the absolute value of the difference between the output value and the target fuel pressure is lower than the absolute value of the difference between the first threshold value and the target fuel pressure (S1: NO), processing proceeds to step S1.

In step S2, an on-board timer used to determine a failure of the fuel pressure sensor 53 starts counting.

In step S3, in the case where the lapse of a predetermined time is counted by the timer (S3: YES), processing proceeds to step S4. In the case where the lapse of a predetermined time is not counted yet by the timer (S3: NO), processing proceeds to step S7.

In step 4, the failure determination part 104 determines the failure of the fuel pressure sensor 53. In step S5, ECU 100 stops a feedback control to a high pressure fuel pump 30.

In step S6, the fuel pressure value changing part 105 changes a fuel pressure value used in the correction and the like of a fuel injection amount to a fixed value.

In step S7, in the case where the absolute value of the difference between the output value and the target fuel pressure is higher than the absolute value of the difference between the second threshold value and the target fuel pressure (S7: YES), processing proceeds to step S8. On the other hand, in the case where the absolute value of the difference between the output value and the target fuel pressure is lower than the absolute value of the difference between the second threshold value and the target fuel pressure (S7: NO), processing proceeds to step S3.

In step S8, the failure possibility detection part 103 detects a failure possibility of the fuel pressure sensor 53.

In step S9, the fuel pressure value changing part 105 changes the fuel pressure value used in the correction and the like of the fuel injection amount to the second threshold value.

FIG. 3 is a time chart showing the change of each control value of the fuel supply system 1 according to the present embodiment. The change of each value in the fuel supply system 1 will now be described with reference to FIG. 3. In FIG. 3, for the sake of simplification, a case where both the first and second threshold values are higher than the target fuel pressure is shown, but the embodiment of the present invention is not limited to this.

In the example shown in FIG. 3, a first threshold value as the criteria for detecting a failure on board is a value adding 5 MPa to the target fuel pressure. Also, a second threshold value using in the action prior to failure determination of the fuel pressure sensor 53 is a value adding 20 MPa to the target fuel pressure. It is to be noted that these values are just an example and are not limited to these.

The fuel pressure sensor 53 is not failed until time t1 and by performing a feedback control of the high pressure fuel pump 30, an output value (an actual fuel pressure) of the fuel pressure sensor 53 and a target fuel pressure are matched.

At time t1, a failure occurs in the fuel pressure sensor 53 and as a result, the output value of the fuel pressure sensor 53 deviates from the target fuel pressure and increases at a higher slope than that of a change of the target fuel pressure.

At time t2, the output value exceeds a first threshold value. At the same time, an on-board failure determination timer starts counting.

AT time t3, the output value exceeds a second threshold value. At the same time, the fuel pressure value changing part 105 changes a fuel pressure value used in the correction and the like of a fuel injection amount to a second threshold value. Since the second threshold value varies with the target fuel pressure as time passes, the fuel pressure value here also varies according to it.

At time t4, after the elapse of a predetermined time (t4–t2) since the timer started counting, the failure determination part 104 determines the failure of the fuel pressure sensor 53. At the same time, ECT 100 stops a feedback control of the high pressure fuel pump 30 and the fuel pressure value changing part 105 changes the fuel pressure value used in the correction and the like of the fuel injection amount to a fixed value, for example, 0.4 MPa. It is to be noted, however, that this value is just an example and is not limited to this.

According to the fuel supply system 1 of the present embodiment, there are effects as set forth below:

(1) In the fuel supply system 1 of which the setting range of a fuel pressure sensor 53 is set wider than hitherto, in the case where the fuel pressure sensor 53 is disconnected or cause a short circuit, a failure possibility of the fuel pressure sensor 53 can be detected prior to the determination of its failure and the occurrence of the engine stall or misfire can be prevented. Also, in the case where the failure possibility is detected, it is possible to suppress excessive correction by setting the second threshold value with respect to the target fuel pressure.

(2) In the case where, even if the output value of the fuel pressure sensor 53 exceeds the second threshold value, it does not exceed the first threshold value for a specified time or longer, since the failure of the fuel pressure sensor 53 is not determined and the feedback control is continued, it is possible to more properly perform the feedback control of the high pressure fuel pump 30 while preventing the occurrence of the engine stall or misfire.

While one embodiment of the present disclosure has been shown and described above, the present invention is not limited to this and various modifications and substitutions may be made without departing from the spirit and scope of the invention. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A fuel supply system comprising: a fuel pressure sensor configured to detect fuel pressure in a fuel delivery pipe; and a failure detector configured to detect a failure of the fuel pressure sensor, wherein the failure detector comprises: a threshold value setting part configured to set a first threshold value which is deviated by a first predetermined value with respect to a target fuel pressure and a second threshold value which is deviated by a second predetermined value with respect to the target fuel pressure, the second predetermined value being larger than the first predetermined value; a failure possibility detection part configured to detect a possibility of failure of the fuel pressure sensor in the case where an absolute value of a difference between an output value of the fuel pressure sensor and the target fuel pressure exceeds an absolute value of a difference between the second threshold value and the target fuel pressure; and a failure determination part configured to determine a failure of the fuel pressure sensor in the case where an absolute value of the difference between the output value of the fuel pressure sensor and the target fuel pressure continuously exceeds an absolute value of a difference between the first threshold value and the target fuel pressure for a threshold length of time.

2. The fuel supply system according to claim 1 further comprising a fuel pressure value changing part configured to change a fuel pressure value for fuel calculation to the second threshold value in the case where the failure possibility detection part detects the possibility of failure of the fuel pressure sensor, wherein the fuel pressure value for fuel calculation is the output value of the fuel pressure sensor used for fuel calculation.

3. The fuel supply system according to claim 1 further comprising a fuel pressure value changing part configured to change a fuel pressure value for fuel calculation to the second threshold value in the case where the failure possibility detection part detects the possibility of failure of the fuel pressure sensor to suppress excessive correction in a feedback-controlling of a fuel pump, wherein the fuel pressure value for fuel calculation is the output value of the fuel pressure sensor used for fuel calculation.

4. The fuel supply system according to claim 3 further comprising a timer to count the threshold length of time, wherein, at a time when the absolute value of the difference between the output value of the fuel pressure sensor and the target fuel pressure exceeds the absolute value of the difference between the first threshold value and the target fuel pressure, the timer starts to count the threshold length of time, then, at a time when the failure possibility detection part detects the possibility of failure, the fuel pressure value changing part changes the fuel pressure value for fuel calculation to the second threshold value, then, at a time when the timer has counted the threshold length of time, the feedback-controlling of the fuel pump is stopped.

* * * * *